Feb. 28, 1933.    A. WARMISHAM    1,899,069

PHOTOGRAPHIC AND PROJECTION OBJECTIVE

Original Filed Aug. 30, 1926

INVENTOR
Arthur Warmisham
BY
Arthur L. Kent
His ATTORNEY

Patented Feb. 28, 1933

1,899,069

UNITED STATES PATENT OFFICE

ARTHUR WARMISHAM, OF LEICESTER, ENGLAND, ASSIGNOR TO KAPELLA LIMITED, OF LEICESTER, ENGLAND, A CORPORATION OF ENGLAND

PHOTOGRAPHIC AND PROJECTION OBJECTIVE

Original application filed August 30, 1926, Serial No. 132,591, and in Great Britain September 26, 1925. Divided and this application filed October 28, 1929. Serial No. 402,837.

This invention relates to photographic and projection objectives and its aim is to provide such objectives corrected for the various aberrations throughout a useful field and having a larger working aperture than hitherto obtained. This application is a division of my application filed August 30th, 1926, Serial No. 132,591.

According to the invention, I achieve this aim by a novel modification of the Petzval type of objective, my novel modification consisting in dividing the front convergent member into two convergent members whereby the residual zonal spherical aberration is so reduced as to enable me to produce objectives of relative aperture F/1.5 while maintaining a sufficiently good state of correction of the zonal spherical aberration to give definition comparable with that given by the conventional Petzval objectives having about two-thirds of this effective diameter.

The invention will be explained in connection with the accompanying drawing, in which:—

Fig. 1 is a diagrammatic view of the conventional Petzval objective given for the purpose of comparison and to facilitate the definition of the terms hereinafter used; and Figs. 2, 3 and 4 are similar views of various different objectives embodying the invention.

Throughout this specification I shall refer to the front of the objective as the end thereof adjacent to the longer conjugate for which the objective is corrected (that is the end which receives the incident light when the objective is used photographically) and to the back of the objective as the end thereof adjacent to the shorter conjugate (that is the end toward the image when the objective is used photographically). The conventional Petzval objective shown in Fig. 1 may, therefore, be defined as consisting of two separated components in which the front component is a single convergent member $A'$ consisting of two elements $a'$, $b'$ cemented together, while the back component consists of a negative member $L'$ and a positive member $M'$, each of which is a single element. As shown, the negative member of the back component is meniscus-shaped having both its curves convex towards the front. The radius of curvature of the front surface of this negative or divergent member is greater than the radius of curvature of the rear surface of such member. Further, the radius of curvature of the rear surface of the divergent member is less than the radius of the front surface of the convergent member behind such divergent member. From this description, it will be understood that I am using the term "element" to indicate a single piece of glass or "simple lens", and the term "member" to indicate complete lens which may consist of a single element like the members L, M, or may consist of two elements cemented together like the member A. In other words, I shall use the term "member" to indicate a complete lens out of contact with other lenses, whether such lens be simple or compound.

The conventional type of Petzval objective has only two convergent members, one in its front component, and one in its back component. By extensive investigations, I have determined that it is this fact which limits the effective working aperture in such objectives, by making impossible satisfactory elimination of the zonal spherical aberration when the relative aperture exceeds F/2. According to my invention, the residual zonal spherical aberration is reduced to make possible an increase in the effective working aperture, by substituting a number of separate convergent members for the single convergent member in the front component of an objective of the Petzval type.

In Fig. 2, I have illustrated a simple embodiment of my invention. In the objective shown in this figure, the front component consists of two convergent members $A_2$, $B_2$. Both these members are meniscus-shaped, presenting their concave surfaces toward the back component. The member $A_2$ is a simple lens consisting of a single element, while the member $B_2$ is a compound lens consisting of two elements $a_2$, $b_2$ cemented together. The back component remains as in the conventional type.

Figure 1:
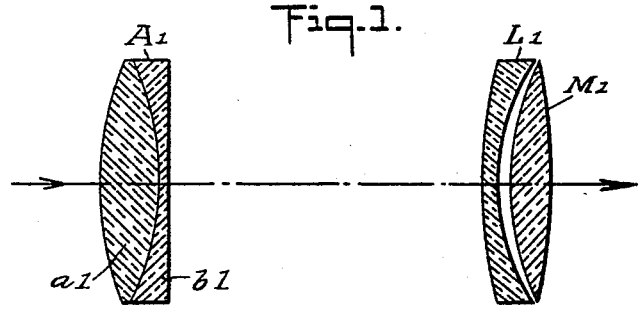
Figure 2:
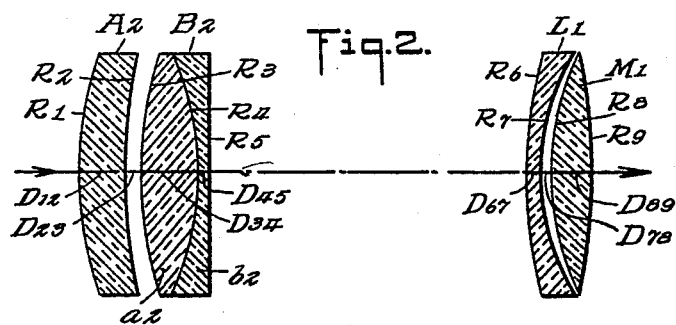
Figure 3:
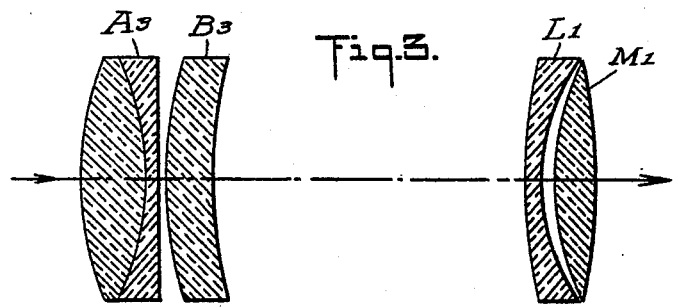
Fig. 3 shows a modification of this construction, in which the positions of the simple and compound members $A_3$, $B_3$ of the front component are interchanged.
Figure 4:
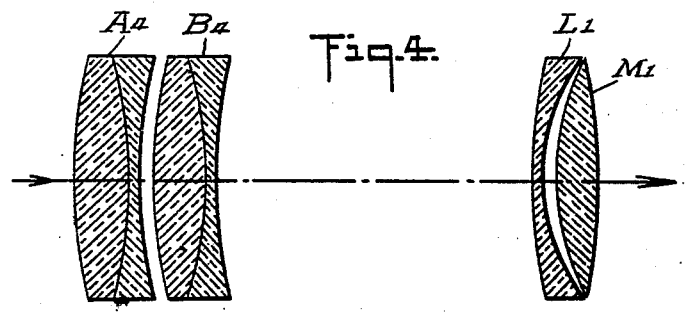
Fig. 4 shows a further development in which the front component consists of two meniscus-shaped convergent members $A_4$, $B_4$, each of which is compound.

In the embodiments of my invention shown in Figs. 2, 3 and 4, all cemented surfaces occurring in the front component are dispersive.

To further illustrate the invention, I give a numerical example of objectives of large aperture, constructed in accordance with the invention. The example may be taken to apply to the objective illustrated in Fig. 2. The notation of the example is that the successive radii of curvature, counting from the front, are called $R_1$, $R_2$, etc., and the sign $+$ denotes that the curve is convex toward the front, and $-$ that it is concave toward the front. The axial distances between the surfaces $R_1$ and $R_2$ are denoted by $D_{12}$ and so on. The material is defined in terms of the mean refractive index $n_D$ and the mean dispersive power $V$, as conventionally employed, and further by the type-number in Messrs. Chance Brothers' optical glass catalogue.

E. F. L. 1.094. Relative aperture F/1.5

|  | $n_D$ | V | Chance Brothers' Catalogue Number |
|---|---|---|---|
| $R_1+ .883$ | | | |
| $D_{12}\ .082$ | 1.5735 | 57.7 | 9002 |
| $R_2+1.454$ | | | |
| $D_{23}\ .002$ | Air | Air | |
| $R_3+ .793$ | | | |
| $D_{34}\ .210$ | 1.5290 | 51.6 | 7863 |
| $R_4- .793$ | | | |
| $D_{45}\ .032$ | 1.6513 | 33.5 | 5093 |
| $R_5+1.775$ | | | |
| $D_{56}\ .326$ | Air | Air | |
| $R_6+ .734$ | | | |
| $D_{67}\ .047$ | 1.6513 | 33.5 | 5093 |
| $R_7+ .471$ | | | |
| $D_{78}\ .047$ | Air | Air | |
| $R_8+ .661$ | | | |
| $D_{89}\ .107$ | 1.6130 | 56.3 | 2065 |
| $R_9-2.54$ | | | |

What is claimed is:

1. An objective of the Petzval type having substantially normal magnification and relatively large working aperture, in which the front component consists of two convergent members at least one of which is compound, all cemented surfaces of said component being dispersive, and in which the back component includes a one-element divergent member and a one-element convergent member behind said divergent element, the front surface of the divergent element being convex to the incident light.

2. An objective of the Petzval type having substantially normal magnification and relatively large working aperture, in which the front component consists of two convergent members at least one of which is compound, all cemented surfaces of said component being dispersive, and in which the back component includes a one-element meniscus-shaped divergent member having both its curves convex towards the front and a one-element convergent member behind the divergent member.

3. An objective of the Petzval type as in claim 2, in which the radius of curvature of the front surface of the divergent member is greater than the radius of curvature of the rear surface of such member.

4. An objective of the Petzval type as in claim 2, in which the radius of curvature of the rear surface of the divergent member is less than the radius of the front surface of the convergent member behind said divergent member.

5. An objective of the Petzval type having substantially normal magnification and relatively large working aperture, in which the front component consists of a one-element convergent member and a compound convergent member behind the first convergent member, the cemented surface of said compound member being dispersive, and in which the back component includes a one-element divergent member having its front surface convex to the incident light and a one-element convergent member behind the divergent member.

6. An objective of the Petzval type having substantially normal magnification and relatively large working aperture, in which the front component consists of a compound convergent member having its cemented surface dispersive and a one-element convergent member behind the first convergent member, and in which the back component includes a one-element divergent member having its front surface convex to the incident light and a one-element convergent member behind the divergent member.

7. An objective of the Petzval type having substantially normal magnification and relatively large working aperture, in which the front component consists of two compound convergent members, each having its cemented surface dispersive, and in which the back component includes a one-element divergent member having its front surface convex to the incident light and a one-element convergent member behind the divergent member.

In testimony whereof I have hereunto set my hand.

ARTHUR WARMISHAM.